US008645236B2

(12) United States Patent  (10) Patent No.: US 8,645,236 B2
Hicks et al.  (45) Date of Patent: *Feb. 4, 2014

(54) DETERMINATION OF EARNED VALUES OF PROGRESS OF A PROJECT

(75) Inventors: Scott Denison Hicks, Underhill Center, VT (US); James A. Martin, Jr., Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,706

(22) Filed: Sep. 12, 2012

(65) Prior Publication Data

US 2013/0006694 A1  Jan. 3, 2013

Related U.S. Application Data

(63) Continuation of application No. 11/159,914, filed on Jun. 23, 2005, now Pat. No. 8,341,042.

(51) Int. Cl.
*G07B 17/00* (2006.01)
*G07F 19/00* (2006.01)
*G06Q 40/00* (2012.01)

(52) U.S. Cl.
USPC .............................................. 705/30; 705/35

(58) Field of Classification Search
USPC ......................................................... 705/35
See application file for complete search history.

(56) References Cited

U.S. PATENT DOCUMENTS

| | | | |
|---|---|---|---|
| 3,702,003 A | 10/1972 | Ramirez et al. | |
| 5,381,332 A | 1/1995 | Wood | |
| 5,774,866 A | 6/1998 | Horwitz et al. | |
| 5,907,490 A | 5/1999 | Oliver | |
| 6,192,475 B1 | 2/2001 | Wallace | |
| 2004/0030992 A1 | 2/2004 | Moisa et al. | |
| 2004/0068419 A1 | 4/2004 | Salwitz et al. | |
| 2006/0184401 A1 | 8/2006 | DelGaudio et al. | |
| 2006/0293982 A1 | 12/2006 | Hicks et al. | |
| 2008/0126517 A1 | 5/2008 | Nakatsuka et al. | |

OTHER PUBLICATIONS

Office Action (Mail Date Apr. 11, 2008) for U.S. Appl. No. 11/159,914, filed Jun. 23, 2005.
Amendment filed May 27, 2008 in response to Office Action (Mail Date Apr. 11, 2008) for U.S. Appl. No. 11/159,914, filed Jun. 23, 2005.
Final Office Action (Mail Date Oct. 1, 2008) for U.S. Appl. No. 11/159,914, filed Jun. 23, 2005.
Amendment After Final filed Nov. 19, 2008 in response to Final Office Action (Mail Date Oct. 1, 2008) for U.S. Appl. No. 11/159,914, filed Jun. 23, 2005.

(Continued)

*Primary Examiner* — Leland Marcus
(74) *Attorney, Agent, or Firm* — Schmeiser, Olsen & Watts, LLP; John R. Pivnichny

(57) ABSTRACT

A system and method for determining earned values (EVs) of progress of a project. At least one EV calculation rule is defined for calculating EVs in terms of components to be combined into the EVs, locations in which the components are located, and formulae required to combine the components. The defined at least one EV calculation rule is used to calculate the Evs. The at least one EV calculation rule, which includes the components, the locations, and the formulae, is stored. Defining the at least one EV calculation rule includes: identifying the components used to calculate the Evs; identifying the locations in which the components are located; and identifying the formulae specifying how the components are combined to create the EVs.

20 Claims, 5 Drawing Sheets

(56) References Cited

OTHER PUBLICATIONS

Advisory Action (Mail Date Dec. 3, 2008) for U.S. Appl. No. 11/159,914, filed Jun. 23, 2005.
Request for Continued Examination and Amendment filed Dec. 23, 2008 in response to Advisory Action (Mail Date Dec. 3, 2008) for U.S. Appl. No. 11/159,914, filed Jun. 23, 2005.
Office Action (Mail Date Apr. 17, 2009) for U.S. Appl. No. 11/159,914, filed Jun. 23, 2005.
Amendment filed Jul. 13, 2009 in response to Office Action (Mail Date Apr. 17, 2009) for U.S. Appl. No. 11/159,914, filed Jun. 23, 2005.
Final Office Action (Mail Date Jan. 15, 2010) for U.S. Appl. No. 11/159,914, filed Jun. 23, 2005.
Amendment After Final filed Mar. 12, 2010 in response to Final Office Action (Mail Date Jan. 15, 2010) for U.S. Appl. No. 11/159,914, filed Jun. 23, 2005.
Advisory Action (Mail Date Apr. 1, 2010) for U.S. Appl. No. 11/159,914, filed Jun. 23, 2005.
Notice of Appeal field Apr. 13, 2010 in response to Advisory Action (Mail Date Apr. 1, 2010) for U.S. Appl. No. 11/159,914, filed Jun. 23, 2005.
Appeal Brief filed Jun. 14, 2010 for U.S. Appl. No. 11/159,614, filed Jun. 23, 2005.
Examiner's Answer to Appeal Brief (Mail Date Apr. 1, 2010) for U.S. Appl. No. 11/159,914, filed Jun. 23, 2005.
Reply brief filed Nov. 1, 2010 in response to Examiner's Answer to Appeal Brief (Mail Date Apr. 1, 2010) for U.S. Appl. No. 11/159,914, filed Jun. 23, 2005.
Board of Patent Appeals and Interferences Decision—Examiner Reversed (Mail Date May 24, 2012) for U.S. Appl. No. 11/159,914, filed Jun. 23, 2005.
Notice of Allowance (Mail Date Aug. 13, 2012) for U.S. Appl. No. 11/159,914, filed Jun. 23, 2005.

Burlington: EMMDB-150 Earned Value\15.01: PTD: All physical inventory–Lotus Notes

| Welcome | Replication | James A Marin–Sent | Workspace | WLN Weedy | EEM Instance | Fw. Microsoft | New Memo | Burlington F... |

Address [ ]

Burlington: EMM DB    509

▷ ☐ 02.0 Ports
▷ ☐ 03.0 Machines
▷ ☐ 04.0 Adapters
▷ ☐ 05.0 Network
▷ ☐ 06.0 Scheduling
▷ ☐ 07.0 eMailed Inventory Process
▷ ☐ 08.0 Billing
▷ ☐ 09.0 Billing Readiness
▷ ☐ 10.0 Migration Views
▷ ☐ 11.0 Reporting
▷ ☐ 12.0 General
▷ ☐ 13.0 Administration
▷ ☐ 14.0 Labor
▽ ☐ 15.0 Earned Value
    ☐ 15.01 PTD All Physical Inventory
    ☐ 15.02 Earned Value Reports
    ☐ 15.05 Ev1010 Detail
    ☐ 15.06 EV1015 Detail
    ☐ 15.07 EV1020 Exclusions Detail
    ☐ 15.08 EV1025 Detail
    ☐ 15.09 EV1085 Detail
    ☐ 15.10 EV1115 Detail
    ☐ 15.11 EV1117 Numerator Detail
☐ PROBLEM RESOLUTION: 06P4007 and ▷ Preview Earned Value Measurements ▷ Generate Earned Value Reports — 511

| Project | Building | Type | Usage | Comp. | No Mig | No Mig No Resp. | Remain. | Total |
|---|---|---|---|---|---|---|---|---|
| ▷ AOD0392 | | | | 3618 | 77 | 0 | 17 | 3712 |
| ▷ AOD1086 | | | | 1001 | 9 | 0 | 101 | 1111 |
| ▷ Unknown | | | | 33 | 59 | 27 | 6 | 125 |
| | | | | 4652 | 145 | 27 | 124 | 4948 |

| Project | Building | Type | Usage | Comp. | No Mig | No Mig No Resp. | Remain. | Total |
|---|---|---|---|---|---|---|---|---|
| ▷ A0D0392 | | | | 3618 | 77 | 0 | 17 | 3712 |
| ▷ A0D1086 | | | | 1001 | 9 | 0 | 101 | 1111 |

Earned Value Measurements
PTD up to current billing month
Project: A000392

| | |
|---|---|
| Total Seats migrated (EV#1010) | 1,139 |
| Total ports in project (EV#1015) | 2,000 |
| Total ports requiring migration (EV#1020) | 1,923 |
| Total ports migrated (EV#1025) | 3,617 |
| Total clients migrated (EV#1085) | 2,011 |
| Total clients migrated (EV#1115) | 138 |
| % Inventory completed (EV#1117) | 85.6% |

DETERMINATION OF EARNED VALUES OF PROGRESS OF A PROJECT

This application is a continuation application claiming priority to Ser. No. 11/159,914, filed Jun. 23, 2005, now U.S. Pat. No. 8,341,042, issued Dec. 25, 2012.

CROSS REFERENCE TO RELATED APPLICATIONS

This application is related to U.S. Patent application entitled "METHOD AND SYSTEM FOR ENTERPRISE-WIDE MIGRATION" Ser. No. 10/728,520 filed Dec. 4, 2003, issued Mar. 23, 2010 as U.S. Pat. No. 7,685,027 (hereinafter the "Enterprise-Wide Migration case") and hereby incorporates paragraphs [0014] through [0032] of such application by reference as if it were set forth in its entirety herein.

This application is also related to U.S. patent application entitled "METHOD FOR PROVIDING BOTH AUTOMATED AND ON-DEMAND PROJECT PERFORMANCE MEASUREMENTS" Ser. No. 10/933,642 filed Sep. 2, 2004, issued Jan. 1, 2008 as U.S. Pat. No. 7,315,977 (hereinafter the "Project Performance Measurements case"), and hereby incorporates such application by reference as if it were set forth in its entirety herein.

BACKGROUND OF THE INVENTION

1. Technical Field

The present invention relates to a system for project management, and more specifically, for a project management system that calculates and reports project completion information in a uniform manner.

2. Related Art

In the past, there have been many large-scale projects covering several geographic areas and several databases and sub-project databases. For example, it is common to upgrade communications, information technology, and other systems on a large-scale basis. These systems typically employ a number of differing types of individual units in which the electronic hardware, software, or associated equipment must be replaced, updated, or have components added to them to change ("migrate") them to the new configuration. This migration involves differing processes and equipment to convert each of the different types of units. These projects may be implemented company-wide over many locations globally. It can become a large task to uniformly track the overall progress of a project.

There have been some prior-art devices which display project progress, however, these tend to use measurements which differ from site to site and subproject to subproject. Therefore, they lack consistency and uniformity and provide inaccurate results.

Currently, there is a need for a project reporting system capable of calculating and displaying project completion information for a large-scale project in a more standardized manner.

SUMMARY OF THE INVENTION

The present invention is a project reporting tool for reporting the progress of a large-scale project.

It may be embodied as a method of reporting earned values (EVs) of a large-scale project, comprising:
defining at least one EV calculation rule for calculating EVs in terms of component's names to be combined into the EVs, locations of these components and formulae required to combine the components;
using the defined set of EV calculation rules to calculate the EVs;
creating an EV report employing the EVs.

It may also be embodied as a tool for calculating and reporting earned value measurements (EVs) of a large-scale project, comprising:
a) at least one subproject database (DB) for storing project completion information;
b) an input device capable of interacting with the subproject database to define EV calculation rules indicating components to be used in calculating EVs, the locations of these components within the subproject database, and formulae describing how to combine the components into EVs;
c) at least one agent adapted to:
  i) use the EV calculation rules to identify the components which will be used,
  ii) use the EV calculation rules to identify the locations of the components which will be used,
  iii) use the EV calculation rules formulae to calculate EVs, and
  iv) store the calculated EVs as a report indicating project completion status.

It may be embodied as a computer program product, comprising a computer usable medium having computer readable program code embodied therein for displaying and reporting earned values (EVs) of progress of a large-scale project, said computer readable program code including an algorithm adapted to:
a) define at least one set of EV calculation rules for calculating the EVs in terms of components, locations of these components and formulae required to combine the components;
b) use the defined EV calculation rules to calculate EVs;
c) create an EV report employing the EVs.

It may also be embodied as a method of providing services to user remotely located to provide reports of progress of a large scale project comprising:
defining at least one EV calculation rule for calculating the EVs in terms of components to be combined into the EVs, locations of these components and formulae required to combine the components;
using the EV calculation rules to calculate EVs;
creating an EV report employing the EVs.

Therefore it can be seen that the present invention overcomes the disadvantages of the prior art, by providing a system that can display and report project-wide information in an organized, understandable manner.

BRIEF DESCRIPTION OF THE DRAWING

FIG. 4 is a screen shot of the display of the present invention showing reports generated by the present invention.

FIG. 5 is a screen shot of the display of the present invention showing another format of a report generated by the present invention.

DETAILED DESCRIPTION OF THE INVENTION

Figure 1:
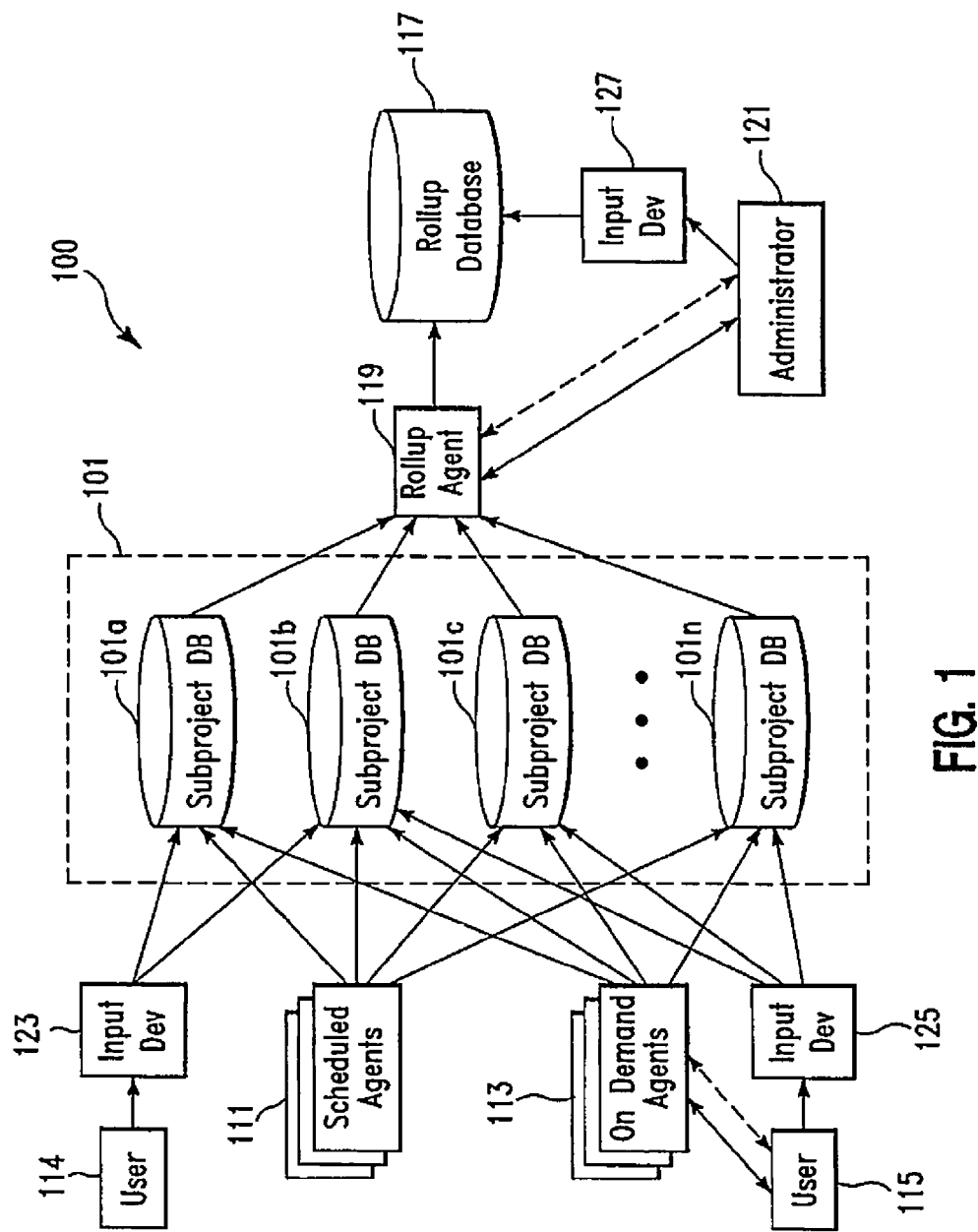
FIG. 1 illustrates a block diagram of the major portions of a system compatible with the present invention.

There are known criteria to measure progress of a large scale project such as a migration of one computer configuration to another over a large number of computers, or migration of people from one type of device to another. One specific measure of the project's progress is through the use of earned value measurements (EVs). These EVs take into account the value of the work completed with reference to the value of the work originally planned.

Earned Value measurements may be computed from the following three types of components of the EV measurement: directly specified, calculated quantity and calculated percentage.

Directly Specified Components

Directly specified components are those specified directly by the project manager or calculated by some means external to the project database and provided to the database in final form. These types of measurements typically often are reported 'as is' and are typically used as denominators in calculated percentage measurements (see "total (sum) of the number of people migrated in "Calculated Ratio Components" infra).

Calculated Quantity Components

Calculated quantity components are numbers (unlike ratios and percentages described below) calculated from other data within the project databases. An example of this type of measurement includes the total (sum) of the number of people migrated to an Ethernet network service over several locations and/or subprojects during an enterprise token-ring to Ethernet migration.

Calculated Ratio Components

Calculated Ratio EV measurements are ratios derived from data within the project/subproject database(s). An example of components for this type of measurement is the percentage of the actual number of people migrated to an Ethernet network service and the total number of people projected to be migrated to the service during an Ethernet migration.

EV Calculation Rules

In order to uniformly determine EVs over various sites, and subprojects, the components used to determine the EVs, their locations and instructions on how they are combined must be specifically identified. These EVs must be uniform project-wide, and calculated in the same manner across all subprojects. Measurements calculated in a standard manner according to the EV Calculation Rules across all subprojects are referred to as 'uniform EVs'.

The components required to calculate the EVs must be identified. Each component may be used alone or be the result of calculations of a set of other components. Similarly this set of components may be the result of calculations of a second set of components, etc. Therefore, it is important to identify the components which are used to calculate the EVs.

The locations of these components are then identified. Since EVs may be calculated over one or more subprojects which may be located at one or more sites linked by communications networks, the site, storage device, file on the storage device and location within the file, or variable name should be specified.

After the components and their locations are determined, the one must specify the mathematical formulae employed to calculate EVs. The identification of components, locations of components, and formulae used in combining the components are stored as EV Calculation Rules. The EV Calculation Rules may be stored in the subproject databases, an overall database, or one or more automated agents which operate on these databases.

An example of the EV Calculation Rules would be helpful in better understanding the invention. A project has three subprojects located in cities named "Elmhurst", "Yorkshire" and "Portland". Each location has a database named EMIGR, YMIGR, and PMIGR stored on computers ELM1, YOR1, POR1, at IP Addresses 3.1.120.1, 3.1.120.2 and 3.1.120.3 respectively. Assume that an EV measurement "Total Clients Migrated" is to be calculated and reported. Assume that this EV is calculated from components (variables) identifying the number of clients migrated at each city named "ClientsMigr" stored on a subproject database EMIGR located at Elmhurst, "ClntMgr" stored on subproject database YMIGR located at Yorkshire, and "MigrEast" and "MigrWest" both stored on POR1 and located at Portland.

Locations of the components are defined. These include an indication of the computer, the storage device, and the folder and subfolder path to the subdatabase file. An example would be:

"C:/data/migration/clients/ClientsMigr.dbf"

Once the components are located and the values of each acquired, they are combined. The EV Calculation Rules include the formulae indicating how the components are combined. In the present example, the formula is to add the values of each of the named components:

Total Clients Migrated=Value(ClientsMigr)+Value (ClntMgr)+Value(MigrEast)+Value(MigrWest).

These uniform EV calculation rules are performed by automated 'agents'. These automated agents may be software programs running on a dedicated or shared processor. These agents interface with one or more of the subproject databases and implement the EV Calculation Rules to create uniform EVs and EV reports.

On-demand Agents

On-demand agents are automated agents that interact with a user to define which EVs are to be calculated and used in the report. The user also indicates when the format of the report and when the report is to be generated.

Scheduled Agents

Scheduled agents run on a schedule which is set and stored in a location where the agent may access it. These agents have access to a clock to be aware of the date/time and run a report at the date/time indicated by the stored schedule.

Event Agents

Event agents are designed to run when an event occurs. For example, the event may be when more than a predetermined number of wall ports have been converted, or some other pre-designated event.

Since the invention may be more clearly understood through a description of a specific embodiment, the remainder of the specification describes the present invention as applied to a large-scale company-wide Ethernet migration, as an example.

FIG. 1 shows a simplified block diagram of the present invention 100. Information regarding the migration project is stored on a plurality of subproject databases (DB) 101a, 101b, 101c . . . or 101n. The subproject DBs are collectively referred to as "subproject DBs 101". The subproject DBs 101 physically may be located together, or they may be distributed at any number of locations and connected through an appropriate wired or wireless network.

These subproject DBs 101 are updated with project completion information relating to a migration project preferably by a project manager of the team responsible for the project. Each project manager updates their appropriate subproject DB, populating it with information specific to their section of the project stored on subproject DB 101 as per the Enterprise-Wide Migration case referenced in "Cross Reference to Related Applications" above, of which a portion has been incorporated by reference here.

For the embodiment described here, information stored on the subproject DBs 101 may include a plurality of entries having one or more of the following: project numbers, sites to migrate, building to migrate, total number of seats to migrate, total number of ports to migrate, total number of printers to migrate, total seats migrated, total ports migrated, total printers migrated, seats requiring migration, ports requiring migration, printers requiring migration, execution dates when each unit has been migrated, project planning information regarding timetables, milestones, resource estimates, estimates of equipment needed, financial, budget, and other migration project information.

This information is stored in a hierarchical structure. Each of the entries is broken down into information separated into a number of entries and a lower hierarchical level. Each of these entries is in turn broken down into a number of entries until one reaches an individual record which contains information about a single unit being migrated.

In FIG. 1, one or more users 114, 115 interact through input devices 123, 125 to indicate aspects of at least one subproject on subproject DBs 101*a*, 101*b*, 101*c* . . . 101*n* on which to report. User 114, 115 identifies the aspects of the project that should be displayed or reported. As stated above, user 114, 115 interact with input devices 123, 125 to identify components required to calculate the EVs and the locations of the components.

Since components may be dispersed over several subprojects at various locations, the name and location of each component must be specified and stored. The location includes routing information to the appropriate storage device, its physical and/or logical address, and its local path. These may include data relating to specific sites, buildings, locations, types of units migrated.

Also, mathematical formulae describing how to combine the components into the desired EVs are specified. The identified components, their locations and the formulae required to calculate the EVs defines the EV Calculation Rules. These rules may be stored in each of the subproject databases, in an overall project database, or in one of the agents.

The EV Calculation Rules are used to calculate project completion information, such as uniform EVs. This is described in more detail in connection with the description of the other figures.

In FIG. 1, a scheduled agent 111 is initialized with an activation schedule identifying dates/times that scheduled agent 111 will periodically be activated. When scheduled, scheduled agent accesses the proper components of the subproject DBs according to the execution date rules and project definition rules. It then calculates uniform EVs and stores these in a report for later use.

The system may also comprise an overall project or rollup database 117 which is capable of storing the project completion information from all subprojects in subproject DB 101.

A rollup agent 119 may operate on components in the subproject DB 101 and/or in rollup database 117 (FIG. 1) in a very similar manner to that of the on-demand agents 113 (FIG. 1).

Rollup agent 119 may also create project-wide reports and store them in rollup database 117.

Figure 2:
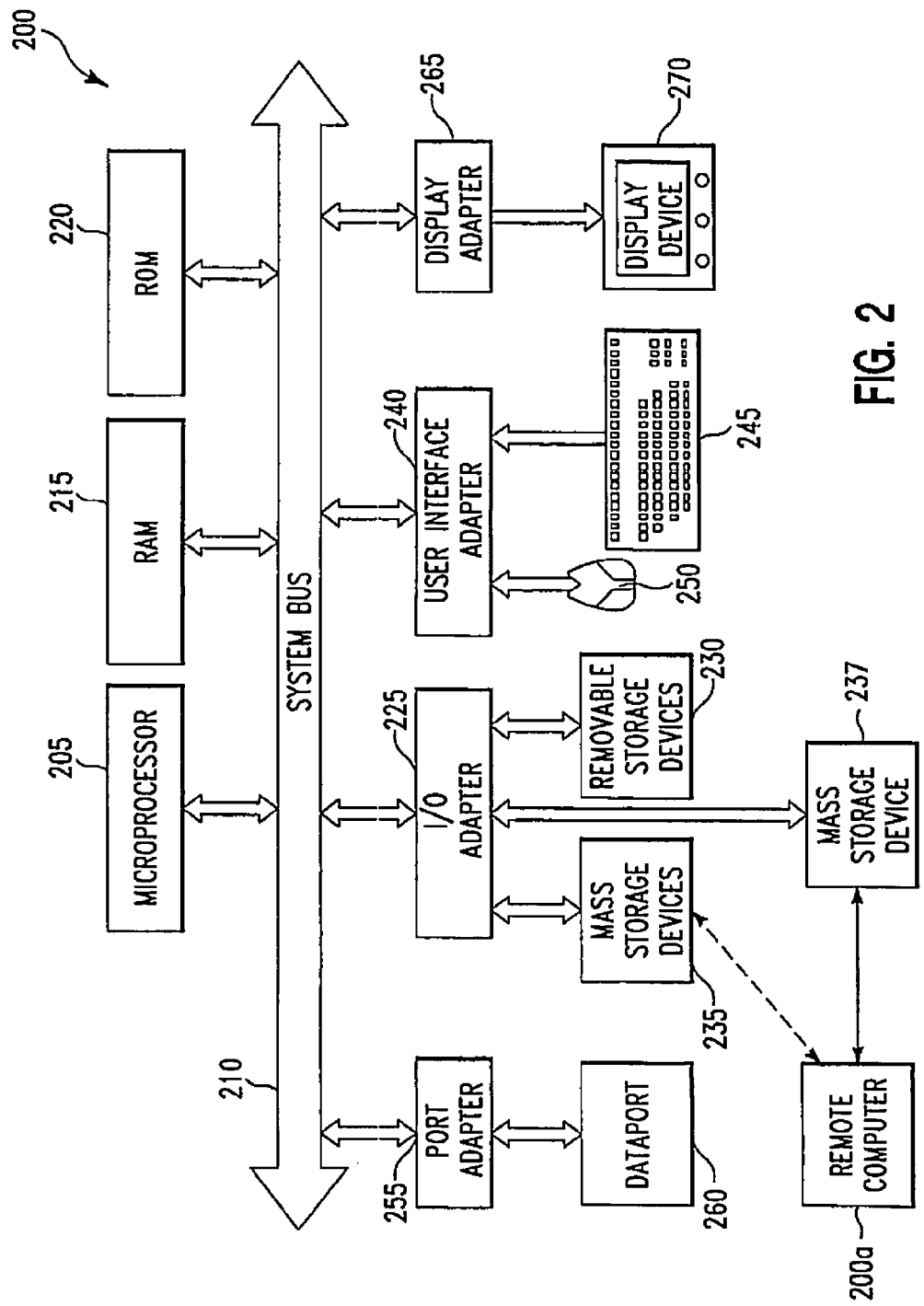
FIG. 2 is a simplified block diagram of a computer system capable of implementing the present invention.

FIG. 2 shows a schematic block diagram of a general-purpose computer for practicing the present invention.

Generally, the functions of all of the agents, the subproject DBs, the project or rollup database, or active elements of FIG. 1, including novel methods performed by the present invention described herein, may be practiced on one or more general-purpose computers 200, 200*a*, or elements of these general-purpose computers. Wherein the methods may be coded as a set of machine-readable instructions and stored on removable or hard disk media for use by the general-purpose computer. FIG. 2 is a schematic block diagram of a general-purpose computer for practicing the present invention. In FIG. 2, a computer system 200 has at least one microprocessor or central processing unit (CPU) 205. CPU 205 is interconnected via a system bus 210 to a random access memory (RAM) 215, a read-only memory (ROM) 220, an input/output (I/O) adapter 225 for communicating with a removable data and/or program storage device 230 and a mass data and/or program storage devices 235, 237. These mass storage devices will store the information from subproject DBs 101 and rollup database 117, respectively (FIG. 1). It is also connected to a user interface adapter 240 for connecting a keyboard 245 and a mouse 250, a port adapter 255 for connecting a data port 260 such as a network interface adapter (NIC) and a display adapter 265 for connecting a display device 270. The NIC may be used to connect to remote databases and computers.

ROM 220 contains basic operating system instructions for computer system 200. The operating system may alternatively reside in RAM 215 or elsewhere as is known in the art. Examples of removable data and/or program storage device 230 include magnetic media such as floppy drives and tape drives and optical media such as CD ROM drives. Examples of mass data and/or program storage devices 235, 237 include one or more hard disk drives and nonvolatile memory such as flash memory. These may be local or remote, directly connected, or connected through a network. In addition to keyboard 245 and mouse 250, other user input devices such as trackballs, writing tablets, pressure pads, microphones, light pens and position-sensing screen displays may be connected to user interface 240. Examples of display devices include cathode-ray tubes (CRT), plasma displays and liquid crystal displays (LCD).

A computer program may be created by one of ordinary skill in the art and stored on the system or a data and/or program storage device 230, or fed into the computer through a data port 260 and executed to practice the present invention.

It is also possible to have one or more other computers 200*a* linked to share, and/or all of the resources of computer 200.

While FIG. 2 shows the computer system 200 as a particular configuration of hardware and software, any configuration of hardware and software, as would be known to a person of ordinary skill in the art, may be utilized for the purposes stated above in conjunction with the use of computer system 200 of FIG. 2.

Figure 3:
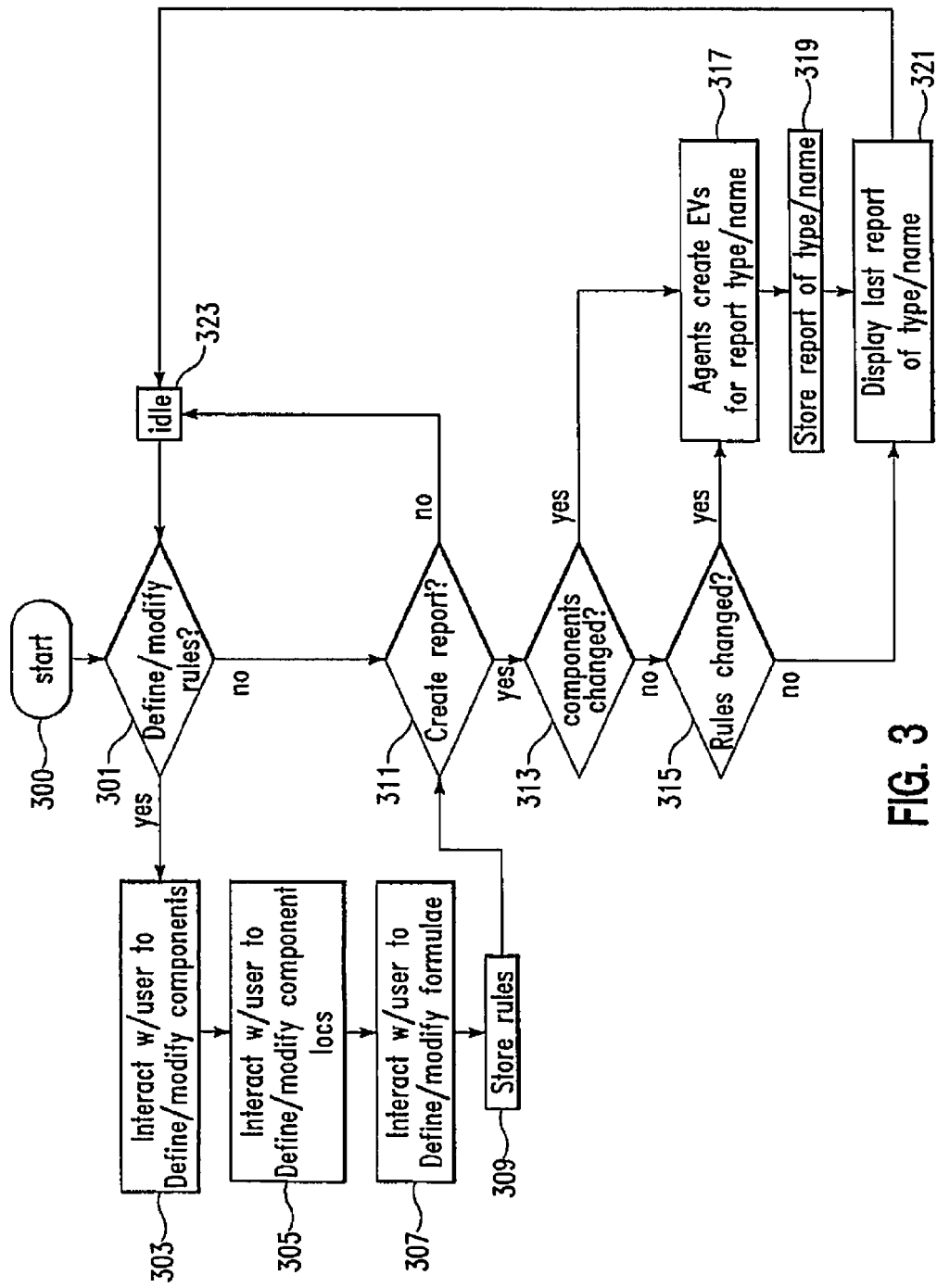
FIG. 3 is a flowchart showing the functioning of one embodiment of the present invention.

FIG. 3 shows a simplified flow chart of the functioning of one embodiment of the present invention.

The process begins at step 300.

In step 301 one or more users 114, 115 of FIG. 1 determine if the EV Calculation Rules are to be defined or modified for a given report type having a specific unique name (type/name).

If the EV Calculation Rules are to be defined or modified, ("yes") and processing continues in step 303.

If the answer is ("no"), then processing continues at step 311.

In step 303, users 114, 115 interact with input devices 123, 125 to define or modify the components to be used in calculating the uniform EVs.

In step 305 users 114, 115 interact with input devices 123, 125 of FIG. 1 to define or modify the locations of the components being used in calculating the uniform EVs.

In step 307 users 114, 115 interact with input devices 123, 125 to define or modify formulae used to combine components into the uniform EVs.

The identified components, their locations and their formulae are stored as EV Calculation Rules at step 309.

In step 311 it is determined if a report is to be generated. If a report is not to be generated ("no"), then processing continues in step 323, where the processor idles for a period of time.

If a report is to be generated ("yes"), then processing continues in step 313.

In step 313 it is determined if any of the components have changed for this type/name report. If so ("yes") processing continues at 317.

If the components for this type/name report have not changed since the generation of the last report ("no"), then processing continues at step 315.

In step 315, it is determined if any of the EV Calculation Rules have changed after this type/name report has been generated. If so ("yes"), processing continues at step 317. If no rules have changed since the last report of type/name has been generated ("no"), processing continues at step 321.

In step 317, agents create uniform EVs according to the stored EV Calculation Rules.

In step 319, the calculated uniform EVs are used to assemble a report of type/name which is stored.

In step 321, the most recently generated type/name report is displayed to users 114, 115.

After displaying the report, processing continues at step 323. After step 323, the process begins again.

The on-demand agents 113 and scheduled agents 111 (FIG. 1) report on the subproject information and do not have the capability for project-wide reporting. Rollup agent 119 has that capability. Once rollup agent 119 has gathered the data (components) from all the subproject DBs 101, rollup agent 119 can now calculate uniform EVs in a very similar manner to the on-demand agents 113, but for the entire project. Therefore, rollup agent 119 performs steps similar to those specified above in FIG. 3, but performs them on the rollup database 117.

FIG. 4 is an illustration of the display of the calculated EVs of the present invention, or a "screen shot" showing a database view of the project completion information accumulated from subproject DBs 101a, 101b, 101c ... 101n and stored in rollup DB 117 (FIG. 1).

On the left of this database view is a first pane 501, with a second pane 503 shown on the right. The information in the right pane shows the next lower level of the hierarchical data of the item highlighted in the left pane, "15.01 PTD All Physical Inventory".

A project administrator 121 at an input device 127 (FIG. 1) highlights an item by navigating a cursor on the display device 270 to the item and then clicking mouse 250 (FIG. 2). As soon as administrator 121 (FIG. 1) selects an item 505, the entries of the next lower hierarchical level are displayed in another pane 507.

In pane 503 (and other subsequent panes), items are listed vertically below each other with column headings 511 running from left to right indicating information common to the items shown. In this embodiment, three projects are shown indicating the number of computers in the project, the number that have been migrated, and the number that have been migrated with other migration information.

A pop-up button is shown as "Preview Earned Value Measurements" button 509. When activated it produces a pop-up dialog box as shown as overlay window 601 in FIG. 5.

A report button 511 of FIG. 4 is shown in this embodiment entitled "Generate Earned Value Report". Activating this button causes a report to be generated as described in the steps of FIG. 3.

Scheduling agent operates on the uniform EVs as set forth in the Project Performance case listed in the "Cross Reference to Related Applications", and hereby incorporated by reference.

The rollup agent operates on the uniform EVs as set forth in the above-referenced Project Performance case to provide uniform and universal project measurement data.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising a processor, a memory coupled to the processor, and a computer readable storage device coupled to the processor, said storage device containing program code configured to be executed by the processor via the memory to implement a method for determining earned values (EVs) of progress of a project, said method comprising:

defining, via said processor, at least one EV calculation rule for calculating EVs in terms of components to be combined into the EVs, locations in which the components are located, and formulae required to combine the components; and said processor using the defined at least one EV calculation rule to calculate the Evs; and said processor storing the at least one EV calculation rule comprising the components, the locations, and the formulae, wherein said defining at least one EV calculation rule comprises:

said processor identifying the components used to calculate the EVs;

said processor identifying the locations in which the components are located;

said processor identifying the formulae specifying how the components are combined to create the Evs.

2. The computer system of claim 1, wherein the components comprise a first set of components, a second set of components, and a third set of components, and wherein said identifying components comprises:

performing calculations of the first set of components to generate the second set of components; and performing calculations of the second set of components to generate the third set of components.

3. The computer system of claim 1, wherein the method further comprises:

said processor creating an EV report employing the Evs.

4. The computer system of claim 3, wherein said storing the at least one EV calculation rule comprises: storing the components, the locations, and the formulae as part of an event agent, and wherein the event agent creates the EV report based upon an occurrence of an event.

5. The computer system of claim 3, wherein said storing the at least one EV calculation rule comprises: storing the components, the locations, and the formulae as part of a scheduled agent, and wherein the scheduled agent reads a schedule defining dates/times to create the EV report based upon dates/times within the schedule.

6. The computer system of claim 3, wherein said storing the at least one EV calculation rule comprises: storing the components, the locations, and the formulae as part of an on-demand agent, and wherein the on-demand agent interacts with a user to specify aspects to report and creates the EV report according to the user's specifications.

7. The computer system of claim 3, wherein the EV report comprises a total number of people actually migrated.

8. The computer system of claim 3,
wherein the EV report comprises aspects of at least one subproject of the project, and
wherein the aspects include sites to migrate, building to migrate, total number of seats to migrate, total number of ports to migrate, total number of printers to migrate, total seats migrated, total ports migrated, total printers migrated, seats requiring migration, ports requiring migration, printers requiring migration, and execution dates when each unit has been migrated.

9. The computer system of claim 1, wherein the project comprises a plurality of subprojects, wherein each subproject comprises a subproject database located in a different city, wherein the components pertaining to the subprojects have values and locations stored on the respective subproject databases comprised by the subprojects, and wherein said identifying locations of the components comprises identifying the locations of the components pertaining to the subprojects by indicating a computer, a physical address and a logical address of a storage device, and a folder and subfolder path to files within the respective subproject databases.

10. The computer system of claim 1, wherein the method further comprises:
said processor displaying a screen shot depicting a first pane and a second pane, wherein the first pane comprises a list of project items such that a selected project item in the list of project items is highlighted, wherein the second pane depicts a next lower hierarchical level of the selected project item, wherein the depicted next lower hierarchical level of the selected project item depicts for the large-scale project and other projects a number of computers of each project, a number of computers of each project that have been migrated, and a number of computers of each project that have been migrated with respect to other migration information, and wherein the second pane presents a list of menu items; and
responsive to selection from the second pane of the large-scale project from the large-scale project and other projects and to selection from the second pane of a menu item from the list of menu items, said processor generating a pop-up dialog box corresponding to the selected menu item for the selected large-scale project, wherein the selected menu item is a preview of earned value measurements for the selected large-scale project, wherein the pop-up dialog box overlays a portion of the first and second panes and displays the preview of earned value measurements for the selected large-scale project, and wherein the displayed preview of earned value measurements for the selected large-scale project comprises a total number of seats migrated, a total number of ports, a total number of ports requiring migration, a total number of ports migrated, a total number of clients migrated, and a percent of inventory completed.

11. A method for determining earned values (EVs) of progress of a project, said method comprising:
defining, via a processor of a computer system, at least one EV calculation rule for calculating EVs in terms of components to be combined into the EVs, locations in which the components are located, and formulae required to combine the components; and
said processor using the defined at least one EV calculation rule to calculate the Evs; and
said processor storing the at least one EV calculation rule comprising the components, the locations, and the formulae,
wherein said defining at least one EV calculation rule comprises:
said processor identifying the components used to calculate the EVs;
said processor identifying the locations in which the components are located;
said processor identifying the formulae specifying how the components are combined to create the EVs.

12. The method of claim 11, wherein the components comprise a first set of components, a second set of components, and a third set of components, and wherein said identifying components comprises:
performing calculations of the first set of components to generate the second set of components; and
performing calculations of the second set of components to generate the third set of components.

13. The method of claim 11, wherein the method further comprises:
said processor creating an EV report employing the Evs.

14. The method of claim 13, wherein said storing the at least one EV calculation rule comprises: storing the components, the locations, and the formulae as part of an event agent, and wherein the event agent creates the EV report based upon an occurrence of an event.

15. The method of claim 13, wherein said storing the at least one EV calculation rule comprises: storing the components, the locations, and the formulae as part of a scheduled agent, and wherein the scheduled agent reads a schedule defining dates/times to create the EV report based upon dates/times within the schedule.

16. The method of claim 13, wherein said storing the at least one EV calculation rule comprises: storing the components, the locations, and the formulae as part of an on-demand agent, and wherein the on-demand agent interacts with a user to specify aspects to report and creates the EV report according to the user's specifications.

17. The method of claim 13, wherein the EV report comprises a total number of people actually migrated.

18. The method of claim 13,
wherein the EV report comprises aspects of at least one subproject of the project, and
wherein the aspects include sites to migrate, building to migrate, total number of seats to migrate, total number of ports to migrate, total number of printers to migrate, total seats migrated, total ports migrated, total printers migrated, seats requiring migration, ports requiring migration, printers requiring migration, and execution dates when each unit has been migrated.

19. The method of claim 11, wherein the project comprises a plurality of subprojects, wherein each subproject comprises a subproject database located in a different city, wherein the components pertaining to the subprojects have values and locations stored on the respective subproject databases comprised by the subprojects, and wherein said identifying locations of the components comprises identifying the locations of the components pertaining to the subprojects by indicating a computer, a physical address and a logical address of a storage device, and a folder and subfolder path to files within the respective subproject databases.

20. The method of claim 11, wherein the method further comprises:
said processor displaying a screen shot depicting a first pane and a second pane, wherein the first pane comprises a list of project items such that a selected project item in the list of project items is highlighted, wherein the second pane depicts a next lower hierarchical level of the selected project item, wherein the depicted next lower hierarchical level of the selected project item depicts for the large-scale project and other projects a number of computers of each project, a number of computers of each project that have been migrated, and a number of computers of each project that have been migrated with respect to other migration information, and wherein the second pane presents a list of menu items; and responsive to selection from the second pane of the large-scale project from the large-scale project and other projects and to selection from the second pane of a menu item from the list of menu items, said processor generating a pop-up dialog box corresponding to the selected menu item for the selected large-scale project, wherein the selected menu item is a preview of earned value measurements for the selected large-scale project, wherein the pop-up dialog box overlays a portion of the first and second panes and displays the preview of earned value measurements for the selected large-scale project, and wherein the displayed preview of earned value measurements for the selected large-scale project comprises a total number of seats migrated, a total number of ports, a total number of ports requiring migration, a total number of ports migrated, a total number of clients migrated, and a percent of inventory completed.

* * * * *